United States Patent [19]
Anderson et al.

[11] Patent Number: 5,913,935
[45] Date of Patent: Jun. 22, 1999

[54] SHIFT CONTROL MECHANISM TO MANUALLY SHIFT AN AUTOMATIC TRANSMISSION

[75] Inventors: Arthur Anderson, Clarkston; Michael F. Donoughe, Rochester Hills; Peter J. Byk, Sterling Heights; James W. Budzyn, Troy, all of Mich.

[73] Assignee: Chrysler Corporation, Auburn Hills, Mich.

[21] Appl. No.: 08/959,090

[22] Filed: Oct. 28, 1997

Related U.S. Application Data

[63] Continuation of application No. 08/506,409, Jul. 24, 1995, Pat. No. 5,722,292, which is a continuation-in-part of application No. 08/253,014, Jun. 2, 1994, Pat. No. 5,509,322.

[51] Int. Cl.⁶ .................................................... F16H 59/00
[52] U.S. Cl. .......................................... 74/335; 74/473.18
[58] Field of Search .................................. 74/335, 473.1, 74/473.12, 473.18, 473.21

[56] References Cited

U.S. PATENT DOCUMENTS

| | | |
|---|---|---|
| 4,442,730 | 4/1984 | Snoy . |
| 4,463,623 | 8/1984 | Miyata et al. . |
| 4,473,141 | 9/1984 | Mochida . |
| 4,476,738 | 10/1984 | Haga et al. . |
| 4,513,276 | 4/1985 | Kubota et al. . |
| 4,513,847 | 4/1985 | Hansen . |
| 4,519,266 | 5/1985 | Reinecke . |
| 4,521,650 | 6/1985 | Oswald . |
| 4,569,244 | 2/1986 | Akerstrom . |
| 4,569,247 | 2/1986 | Inui et al. . |

(List continued on next page.)

FOREIGN PATENT DOCUMENTS

| | | |
|---|---|---|
| 0 122 014 A2 | 10/1984 | European Pat. Off. . |
| 0 207 260 A2 | 1/1987 | European Pat. Off. . |
| 0 353 310 A1 | 2/1990 | European Pat. Off. . |
| 0 467 773 A1 | 1/1992 | European Pat. Off. . |
| 0 547 598 A1 | 6/1993 | European Pat. Off. . |
| 2033200 | 4/1970 | France . |
| 2 298 827 | 8/1976 | France . |
| 37 17 675 A1 | 8/1988 | Germany . |
| 38 32 970 A1 | 5/1990 | Germany . |
| 38 07 881 C2 | 8/1992 | Germany . |
| WO 87/00806 | 12/1987 | WIPO . |
| WO 92/17719 | 10/1992 | WIPO . |

OTHER PUBLICATIONS

"Six Speeds for the Price of Four: A Simple and Compact Automatic Transaxle", SAE International, SAE Technical Paper Series, #941008, by David Ganoung, pp. 127–138.

Upfront publication, Feb. 1994, "In the News", second paragraph bullet, p. 30.

"Electronically Controlled Mechanical Automatic Transmission for Heavy–Duty Trucks and Buses" as found in Transported Electronics: Proceedings of the International Congress on Transportation Electronics, SAE Global Mobility Database, Society of Automotive Engineers, Inc., Oct. 1986, by Shigemitsu Tanaka, et al., 11 pages.

*Primary Examiner*—Dirk Wright
*Assistant Examiner*—Peter T. Kwon
*Attorney, Agent, or Firm*—William J. Coughlin

[57] ABSTRACT

A shift control mechanism for manually shifting an automatic transmission includes a housing having a shift control pattern The shift control pattern has a longitudinal portion defining a plurality of automatic transmission operating settings and a transverse portion at one end of the longitudinal portion for manually shifting the transmission. The shift control mechanism additionally includes a shift lever manually movable along the shift control pattern for selecting the automatic transmission operating settings and for manually shifting the transmission. A switch is provided which is actuated by moving the shift lever in a direction perpendicular to the longitudinal portion in the transverse portion to send a signal to manually upshift or downshift the automatic transmission. A centering mechanism centers the shift lever within the transverse portion.

15 Claims, 7 Drawing Sheets

U.S. PATENT DOCUMENTS

| | | |
|---|---|---|
| 4,570,502 | 2/1986 | Klatt . |
| 4,601,214 | 7/1986 | Fukuchi . |
| 4,612,820 | 9/1986 | Behrens . |
| 4,630,499 | 12/1986 | Hopkins . |
| 4,633,987 | 1/1987 | Rogner et al. . |
| 4,646,582 | 3/1987 | Kijima . |
| 4,660,433 | 4/1987 | Horiuchi et al. . |
| 4,726,249 | 2/1988 | Inuzuka et al. . |
| 4,784,007 | 11/1988 | Ishida et al. . |
| 4,909,096 | 3/1990 | Kobayashi . |
| 4,912,997 | 4/1990 | Malcolm et al. . |
| 4,947,967 | 8/1990 | Kito et al. . |
| 4,960,008 | 10/1990 | Yen et al. . |
| 4,987,792 | 1/1991 | Mueller et al. . |
| 4,991,535 | 2/1991 | Kobayashi et al. . |
| 5,009,128 | 4/1991 | Seidel et al. . |
| 5,029,680 | 7/1991 | Kobayashi et al. . |
| 5,044,220 | 9/1991 | Raff et al. . |
| 5,044,221 | 9/1991 | Suzuki et al. . |
| 5,053,959 | 10/1991 | Genise . |
| 5,056,376 | 10/1991 | Moroto et al. . |
| 5,062,314 | 11/1991 | Maier et al. ............... 74/473.18 |
| 5,070,740 | 12/1991 | Giek et al. . |
| 5,079,966 | 1/1992 | Ishizuki et al. . |
| 5,127,288 | 7/1992 | Hojo et al. . |
| 5,150,633 | 9/1992 | Hillgartner . |
| 5,156,243 | 10/1992 | Aoki et al. . |
| 5,161,422 | 11/1992 | Suman et al. . |
| 5,178,042 | 1/1993 | Moroto et al. . |
| 5,195,387 | 3/1993 | Skeppstrom ............... 74/473.18 X |
| 5,197,344 | 3/1993 | Maier et al. . |
| 5,205,180 | 4/1993 | Moroto et al. . |
| 5,207,124 | 5/1993 | Anderson et al. . |
| 5,233,525 | 8/1993 | Overmann et al. . |
| 5,393,275 | 2/1995 | Okada et al. . |
| 5,406,860 | 4/1995 | Easton et al. ............... 74/335 |
| 5,420,565 | 5/1995 | Holbrook . |
| 5,450,767 | 9/1995 | Willford et al. . |
| 5,453,732 | 9/1995 | Takano . |
| 5,497,673 | 3/1996 | Kataumi et al. . |
| 5,509,322 | 4/1996 | Anderson et al. . |
| 5,527,234 | 6/1996 | Kroeger ............... 74/335 X |
| 5,566,582 | 10/1996 | Beadle et al. . |
| 5,584,209 | 12/1996 | Isssa ............... 74/335 |
| 5,601,510 | 2/1997 | Sakakiyama et al. . |
| 5,675,315 | 10/1997 | Issa et al. . |
| 5,680,307 | 10/1997 | Issa et al. ............... 74/473.18 X |
| 5,722,292 | 3/1998 | Anderson et al. . |
| 5,767,769 | 6/1998 | Issa ............... 74/335 X | ns. Engine torque and speed are converted in the

SHIFT CONTROL MECHANISM TO MANUALLY SHIFT AN AUTOMATIC TRANSMISSION

CROSS-REFERENCE TO RELATED APPLICATION

This application is a continuation of application Ser. No. 08/506,409, filed, Jul. 4, 1995, entitled "Shift Control Mechanism to Manually Shift an Automatic Transmission," now U.S. Pat. No. 5,722,242 by the same inventors as in the present application, which This is a Continuation-In-Part of U.S. Ser. No. 08/253,014, filed Jun. 2, 1994 now U.S. Pat. No. 5,509,322 and entitled "SHIFT CONTROL MECHANISM TO MANUALLY SHIFT AN AUTOMATIC TRANSMISSION."

BACKGROUND OF THE INVENTION

1. Field of the Invention

The present invention relates generally to shift control mechanisms for transmissions and, more particularly, to a shift control mechanism to manually shift an automatic transmission.

2. Description of the Related Art

Automotive vehicles require a power train to transmit the force of an engine to wheels of the vehicle. The power train's main component is typically referred to as the "transmission". Engine torque and speed are converted in the transmission in accordance with the tractive-power demand of the vehicle. Transmissions are generally referred to as manually actuated or automatic transmissions. Manual transmissions generally include mechanical mechanisms for coupling rotating gears to produce different ratio outputs to drive the wheels. Automatic transmissions are designed to take automatic control of the frictional units, gear ratio selection and gear shifting.

Recently, there has been a demand to provide an automatic transmission that may be manually shifted in addition to normal automatic transmission operation. Such shifting is typically provided by a shift control mechanism. An example of such a shift control mechanism is disclosed in U.S. Pat. No. 4,905,530 to Stehle et al. This patented shift control mechanism for an automatic transmission includes a selector lever to be operated manually. The selector lever is displaced in a first shifting lane for selecting different transmission speeds during normal automatic mode operation and transversely in a second shifting lane to manually engage the desired forward speed. However, there is a need in the art to provide a new and improved shift control mechanism.

SUMMARY OF THE INVENTION

It is, therefore, one object of the present invention to provide an improved shift control mechanism for an automatic transmission.

It is another object of the present invention to provide an improved shift control mechanism to manually shift an automatic transmission.

To achieve the foregoing objects, the present invention is a shift control mechanism for an automatic transmission including a housing having a shift control pattern with a longitudinal portion defining a plurality of automatic transmission operating settings and a transverse portion at one end of the longitudinal portion defining a plurality of manual transmission operating settings. The shift control mechanism also includes a shift lever which is manually movable along the shift control pattern for selecting the automatic transmission operating settings and for selecting the manual transmission operating settings. The shift control mechanism further includes a Hall Effect sensor/switch assembly actuated by moving the shift lever to a first position in the transverse portion to send a signal to manually upshift the automatic transmission and to a second position in the transverse portion opposite the first position to send a signal to manually downshift the automatic transmission.

One advantage of the present invention is that a shift control mechanism is provided for an automatic transmission. Another advantage of the present invention is that a shift control mechanism is provided for manually shifting an automatic transmission. Yet another advantage of the present invention is that the shift control mechanism uses a Hall Effect sensor/switch to sense the position of a shift lever to generate a signal to manually shift the automatic transmission.

Other objects, features and advantages of the present invention will be readily appreciated as the same becomes better understood after reading the subsequent description taken in conjunction with the accompanying drawings.

DESCRIPTION OF THE PREFERRED EMBODIMENT(S)

Figure 1:
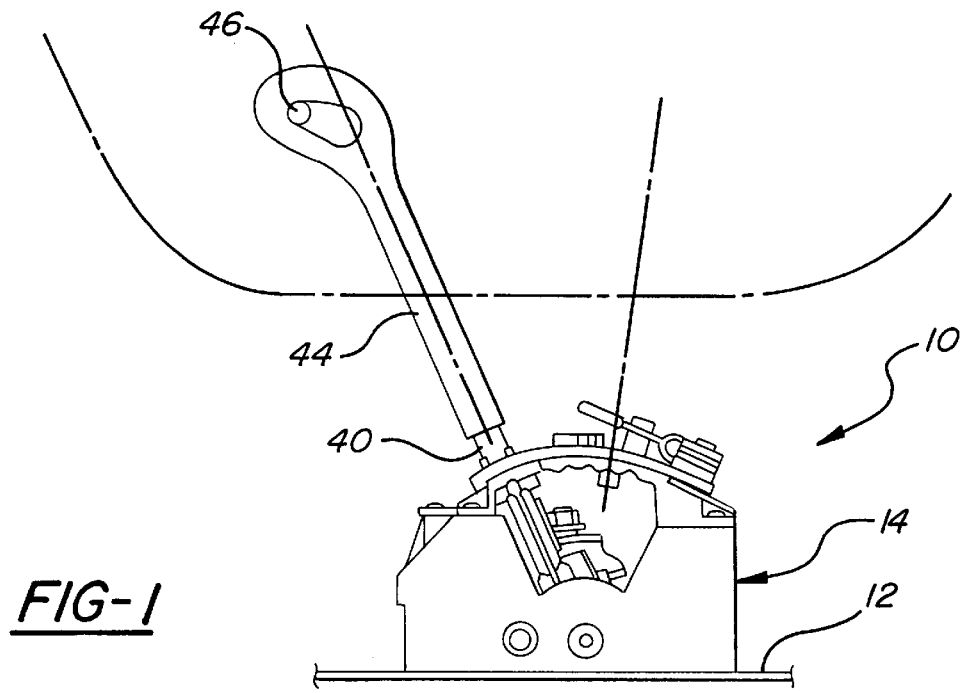
FIG. 1 is an elevational view of a shift control mechanism, according to the present invention, illustrated in operational relationship with vehicle structure.

Referring to FIG. 1, a shift control mechanism 10, according to the present invention, is illustrated in operational relationship with vehicle structure 12 such as a vehicle floor of an automotive vehicle (not shown). The shift control mechanism 10 is operatively connected to a key cylinder lock housing (not shown) and an automatic transmission (not shown) via cables (not shown). The automatic transmission may be of the type disclosed in U.S. Pat. No. 4,875,391 to Leising et al., the disclosure of which is hereby incorporated by reference. The connections of the shift control mechanism 10 to the automatic transmission and key cylinder lock housing are similar to that disclosed in U.S.

Pat. No. 5,207,124 to Anderson et al., the disclosure of which is hereby incorporated by reference.

Referring to FIGS. 1 through 4, the shift control mechanism 10 includes a housing, generally indicated at 14. The housing 14 is generally rectangular in shape and has a bottom wall 16. The housing 14 also has a pair of side walls 18 and 20 spaced transversely and a pair of end walls 22 and 24 spaced longitudinally and extending upwardly generally perpendicular to the bottom wall 16. The housing 14 further includes a cover 26 having an arcuate-shaped central portion 28 and generally planar flange portions 30 secured to a top edge of the walls 18, 20, 22, 24 by suitable means such as screws 32. It should be appreciated that the walls 16, 18, 20, 22 and 24 may be integral and formed as one-piece from a plastic material such as by molding.

Figure 2:
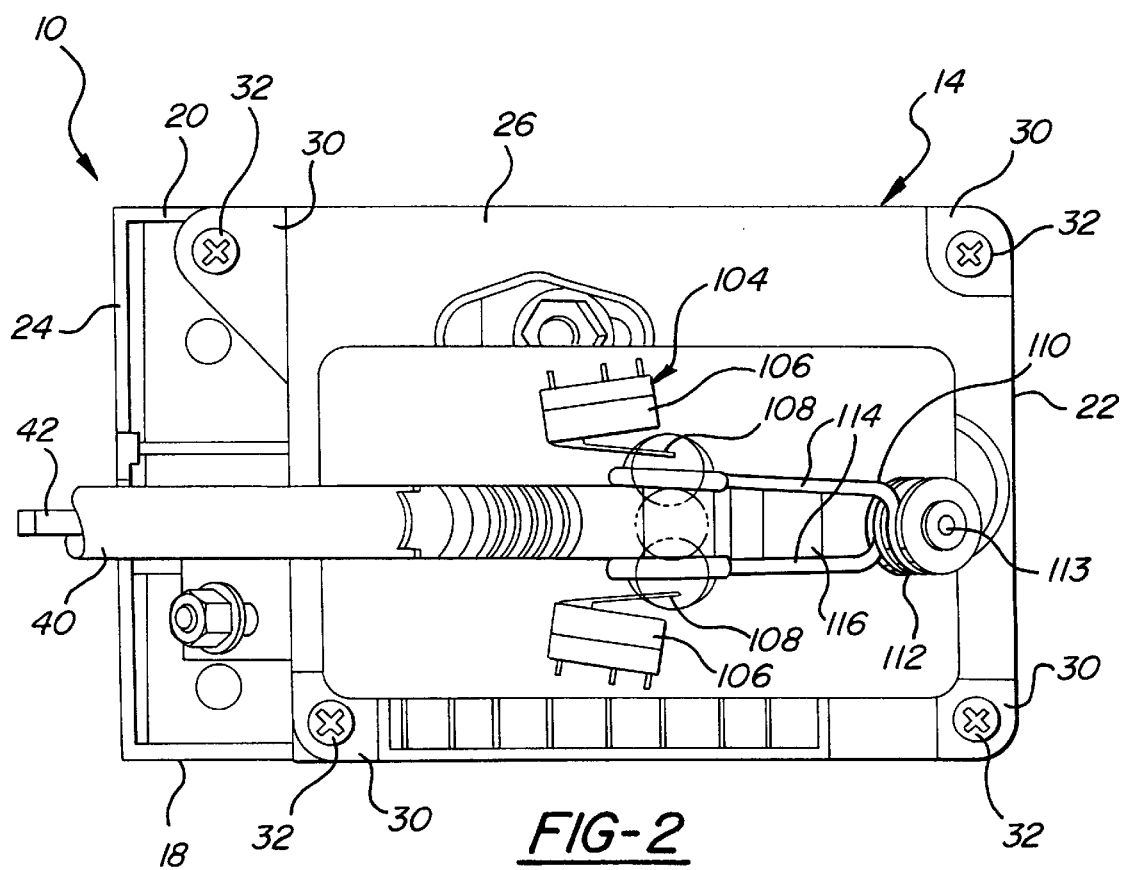
FIG. 2 is an enlarged plan view of the shift control mechanism of FIG. 1.
Figure 3:
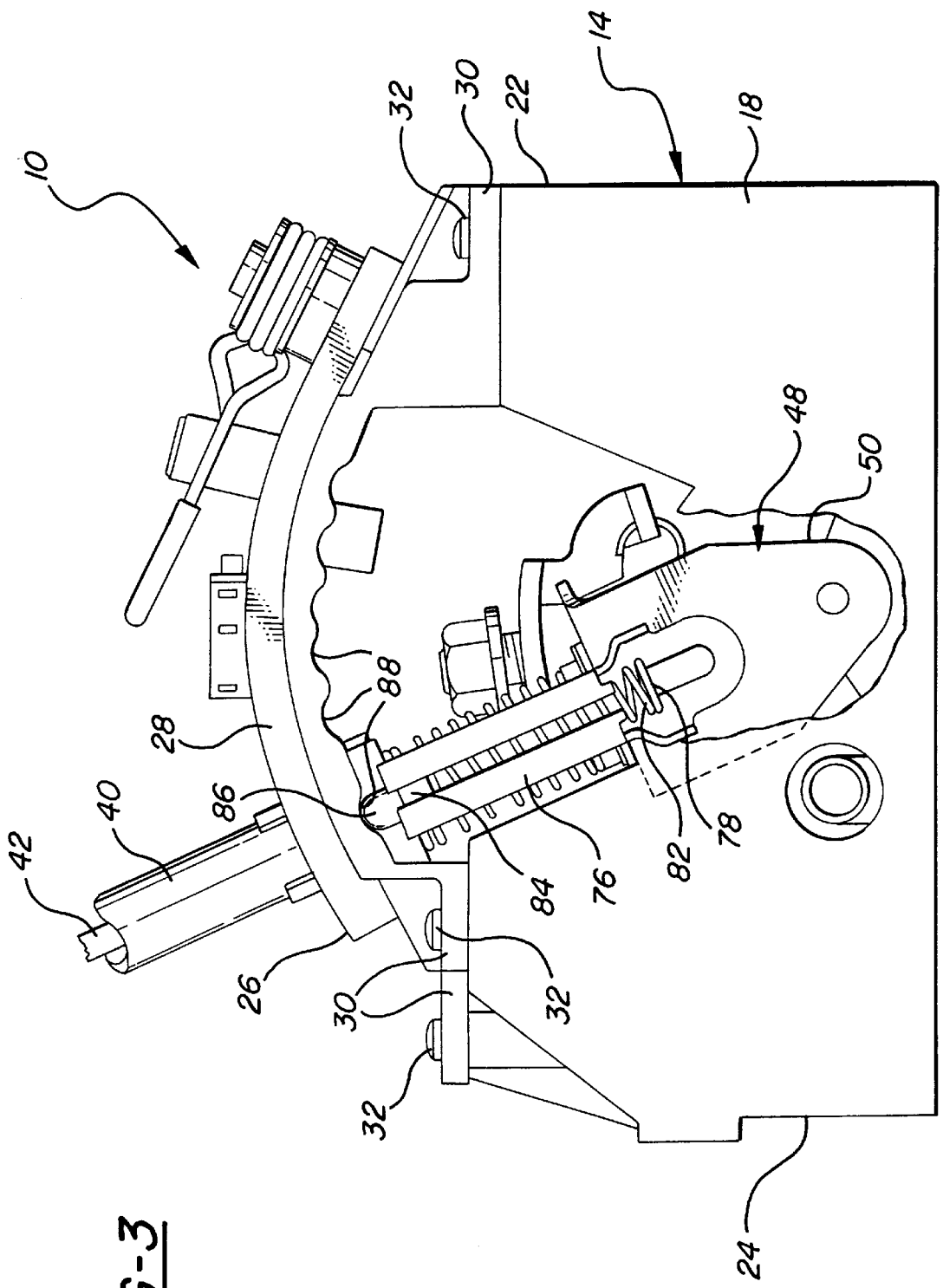
FIG. 3 is a fragmentary side elevational view of the shift control mechanism of FIG. 1.
Figure 4:
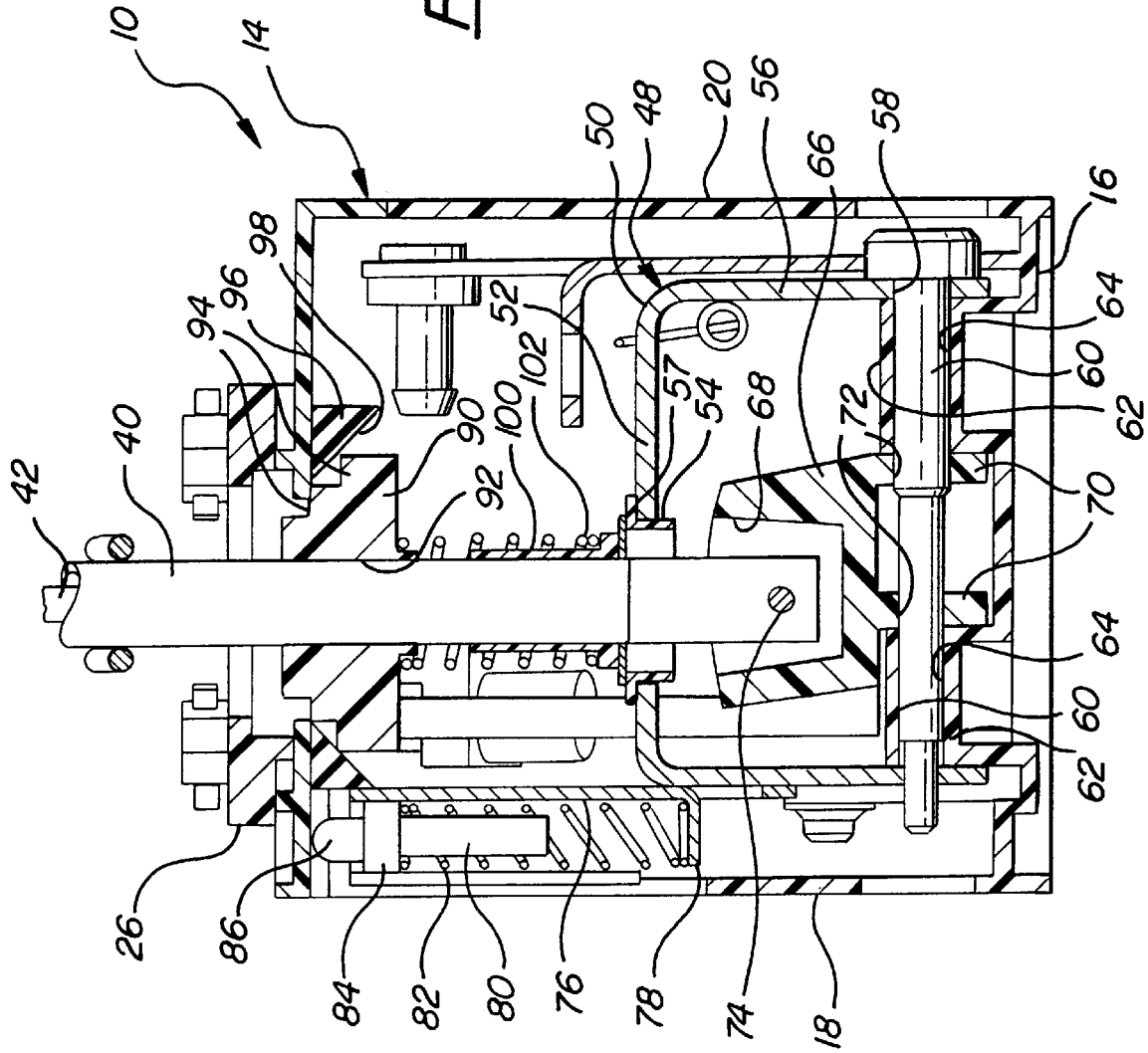
FIG. 4 is a sectional view taken along line 4—4 of FIG. 2 illustrating the shift control mechanism in a first operational position.
Figure 6:
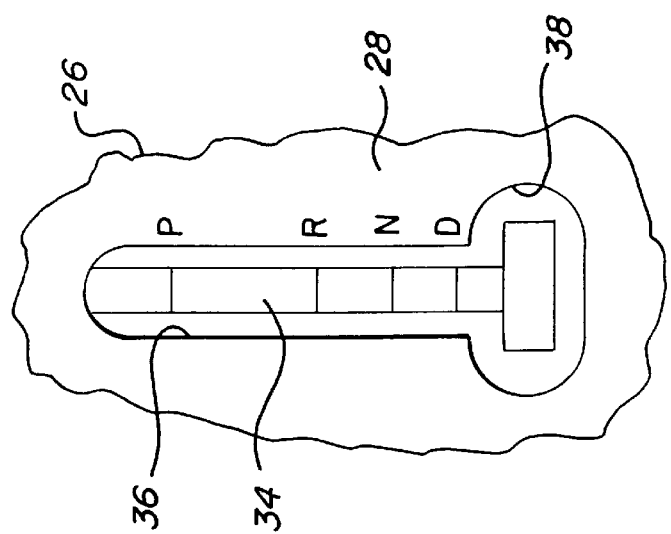
FIG. 6 is a partial plan view of a shift control pattern shift control mechanism of FIG. 1.

Referring to FIGS. 2 and 6, the central portion 28 of the cover 26 includes a shift control pattern formed by an inverted and generally T-shaped guide slot 34 extending therethrough. The guide slot 34 has a longitudinal portion 36 with predetermined automatic transmission operating gears or settings such as Park (P) Reverse (R), Neutral (N) and Drive (D) for selecting transmission speeds to be automatically engaged in the automatic transmission during normal automatic transmission operation. The guide slot 34 has a transverse portion 38 at one end of the longitudinal portion 36 with predetermined manual transmission operating settings such as Manual (M), Upshift (+) and Downshift (−) to select and manually shift or engage the desired forward speed during manual operation of the automatic transmission. It should be appreciated that the automatic transmission may be manually shifted by moving transversely from the M setting to either the + or − setting.

Referring to FIGS. 1 through 4, the shift control mechanism 10 also includes a shift lever 40 to shift the automatic transmission. The shift lever 40 extends through the guide slot 34 in the cover 26 and is manually operated or displaced through the Park (P), Reverse (R), Neutral (N), Drive (D), Manual (M), upshift (+) and downshift (−) settings. The shift lever 40 has a shift rod 42 slidably mounted therein. The shift lever 40 also has a palm abutting knob 44 surrounding the shift lever 40 and a push button 46 extending from the palm abutting knob 44 for a function as described in U.S. Pat. No. 5,207,124 to Anderson et al.

The shift control mechanism 10 further includes a mounting assembly, generally indicated at 48, for pivotally mounting the shift lever 40 within the housing 14. The mounting assembly 48 includes a bracket 50 having an inverted and generally U-shape. The bracket 50 has a generally horizontal base portion 52 with a central opening 54 and leg portions 56 generally perpendicular to and at each end of the base portion 52. The base portion 52 has a bushing 57 disposed in the central opening 54. The leg portions 56 include an opening 58 extending therethrough near a free end thereof. The mounting assembly 48 also includes a pivot pin 60 for pivotally mounting the bracket 50 to the housing 14. The pivot pin 60 is mounted between mounting brackets 62 formed on the bottom wall 16 of the housing 14. The pivot pin 60 extends through the openings 58 of the leg portions 56 and a passageway 64 of the mounting brackets 62. It should be appreciated that the bracket 50 pivots or rotates longitudinally about the pivot pin 60.

The mounting assembly 48 also includes a connecting member 66 for pivotally connecting the shift lever 40 to the pivot pin 60. The connecting member 66 has a cavity 68 to form a generally U-shaped cross-section. The connecting member 66 also has a pair of transversely spaced and downwardly extending flanges 70 with openings 72 extending therethrough. The pivot pin 60 extends through the openings 72 in the flanges 70 to allow the connecting member 66 to pivot or rotate longitudinally about the pivot pin 60. The mounting assembly 48 includes a cross-over pin 74 for pivotally connecting the shift lever 40 to the connecting member 66. The cross-over pin 74 extends through openings in the shift lever 40 and connecting member 66 to allow the shift lever 40 to pivot or rotate transversely about the cross-over pin 74. It should be appreciated that the connecting member 66 allows longitudinal pivotal movement of the shift lever 40 in the longitudinal portion 36 of the guide slot 34 and the cross-over pin 74 allows transverse pivotal movement of the shift lever 40 in the transverse portion 38 of the guide slot 34. It should also be appreciated that the longitudinal portion 36 of the guide slot 34 prevents transverse pivotal movement of the shift lever 40 and guides the shift lever 40 along a predetermined path.

The mounting assembly 48 may include a tubular member 76 with a bottom seat 78 secured to a left end of the bracket 50 by suitable means such as welding. The mounting assembly may also include a detente member 80 slidably mounted in the tubular member 76 and urged upwardly therefrom by a coil spring 82 mounted between the bottom seat 78 and a flange 84 formed around the detente member 80. The detent member 80 has an extended end 86 which is rounded and received in a plurality of rounded indentations 88 formed in the inner surface of an edge portion of the central portion 28 of the cover 26. A further explanation of the structure and operation may be found in U.S. Pat. No. 5,207,124 to Anderson et al.

The mounting assembly 48 further includes a first guide member 90 having a central opening 92 disposed about the shift lever 40. The guide member 90 has a plurality of steps 94 spaced axially and formed in an outer periphery thereof for a function to be described. The mounting assembly 48 includes a second guide member 96 on an interior surface of the cover 26. Preferably, the second guide member 96 is integral with the cover 26. The second guide member 96 has a cam profile or cooperating surface 98. The steps 94 of the guide member 90 form a generally point contact with the cooperating surface 98 to move therealong. The mounting assembly 48 also includes a retainer bushing 100 disposed about the shift lever 40 and a coil spring 102 disposed about the shift lever 40 between the first guide member 90 and the retainer bushing 100. The coil spring 102 urges the first guide member 90 axially away from the retainer bushing 100. It should be appreciated that the retainer bushing 100 is fixedly secured to the shift lever 40 and the first guide member 90 is slidable along the shift lever 40.

The shift control mechanism 10 also includes a switch assembly, generally indicated at 104, to send signals directly to a transmission controller (not shown) for shifting the automatic transmission. Such a transmission controller is disclosed in U.S. Pat. No. 4,875,391 to Leising et al. The switch assembly 104 includes switches 106 disposed on each transverse side of the slot 36 in the cover 26. The switches 106 are attached to the cover 26 by suitable means. The switches 106 have a spring loaded contact 108 which extends outwardly over the + and − settings of the transverse portion 38. When the shift lever 40 contacts or deflects one of the contacts 108, the switch 106 sends a signal to the transmission controller. The switches 106 are connected by connectors (not shown) and electrical wires (not shown) to the transmission controller. It should be appreciated that the transmission controller executes a command to shift the automatic transmission.

The shift control mechanism 10 further includes a return spring 110 for centering or urging the shift lever 40 to the M setting. The return spring 110 has a coil portion 112 secured to the cover 26 by suitable means such as a fastener 113. The return spring 110 also has a pair of fingers 114 extending longitudinally and spaced transversely by a spacer 116 extending upwardly from the cover 26. The shift lever 40 is disposed between the fingers 114. Alternatively, the return spring 110 may be of the torsional type and disposed about the cross-over pin 74 or a pair of springs of the compression type disposed on opposed sides of the shift lever 40 for centering or urging the shift lever 40 to the M setting.

Figure 5:
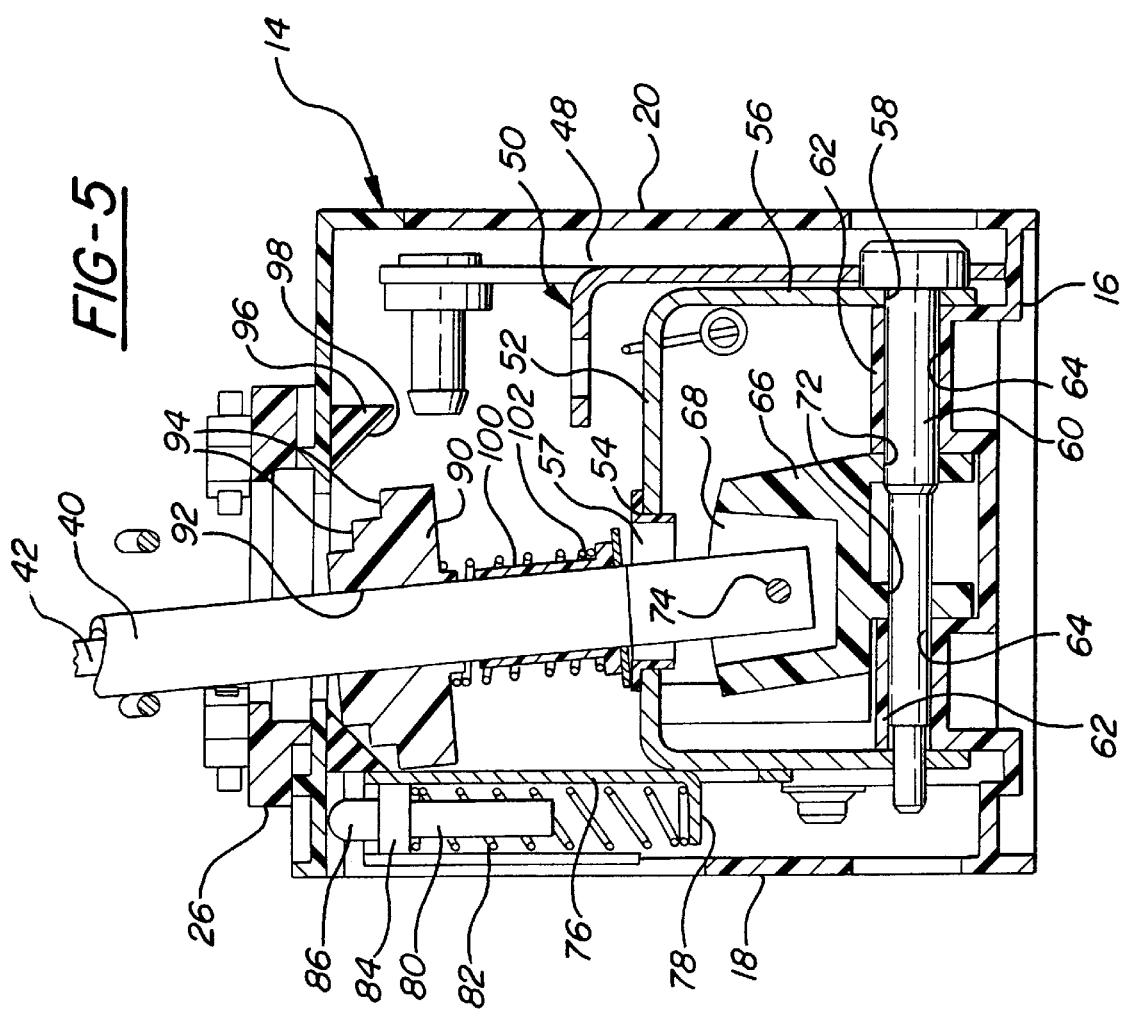
FIG. 5 is a view similar to FIG. 4 illustrating the shift control mechanism in a second operational position.

In operation, the shift lever 40 is moved longitudinally by an operator from the P setting to either the R, N or D setting to allow normal automatic operation of the automatic transmission. When the shift lever 40 is in the D setting, the operator may desire to manually shift the automatic transmission. If so, the shift lever 40 is moved longitudinally by the operator from the D setting to the M setting to allow manual shifting of the automatic transmission. If a downshift is desired, the operator moves transversely the shift lever 40 to the—setting to downshift the automatic transmission. When this occurs, the shift lever 40 contacts and deflects the contact 108 of the switch 106 to send a signal to the transmission controller which then executes a command to downshift the automatic transmission. As illustrated in FIG. 5, the first guide member 90 moves downwardly against the spring 102 and one of the fingers 114 of the return spring 110 is deflected transversely. After the shift lever 40 is moved to the—setting, the operator releases the shift lever 40. When this occurs, the finger 114 moves the shift lever 40 transversely to the M setting and, as the coil spring 102 urges the first guide member 90 upwardly, the steps 94 of the first guide member 90 slide along the cooperating surface 98 of second guide member 96. It should be appreciated that the operation is similar for movement of the shift lever 40 from the M setting to the + setting for an upshift of the automatic transmission.

Referring to FIGS. 7 through 11, another embodiment of the shift control mechanism 10 includes a proximity switch assembly, generally indicated at 204 wherein like references numerals have been used to designate like structure as discussed above. As with the switch assembly 104 shown in the other Figures, the proximity switch assembly 204 shown in FIGS. 7 through 11 is actuated by moving the shift lever 40 to a first position in the transverse portion 38 to send a signal to manually upshift the automatic transmission. The proximity switch assembly 204 is also actuated when the shift lever 40 is moved to a second position in the transverse portion 38 opposite the first position to send a signal to manually downshift the automatic transmission. As can best be seen with reference to FIGS. 9 and 10, the proximity switch assembly 204 includes a switch housing, generally indicated at 206 and a shift lever engagement member, generally indicated at 208. The shift lever engagement member 208 is pivotally mounted to the switch housing 206 and movable with the shift lever 40 to the first and second transverse positions to manually shift the automatic transmission. The switch housing 206 includes a base support stud 212 operatively supporting the switch housing 206 upon the bottom wall 16 of the shift control mechanism housing 14. In addition, the switch housing 206 includes a pair of horizontally extending flanges 216 disposed on either side of the switch housing 206 for securing the switch housing 206 to the cover 26 of the shift control mechanism housing 14 by using a pair of fasteners 218. The switch housing 206 further includes a plurality of support prongs 220 for a function to be described.

The shift lever engagement member 208 includes a body 222 and a hub 224 disposed at one end of the body 222. The shift lever engagement member 208 includes a magnet 209 recessed in the shift lever engagement member 208. The magnet 209 is located such that its travel crosses the Hall Effect sensor/switch 240 to be described. The shift lever engagement member 208 is mounted on the support prongs 220 at the hub 224. The shift lever engagement member 208 also includes a yoke 226 disposed at the other end of the body yoke 226 extends transversely to the body 222. As can best be seen with reference to FIG. 7, the yoke 226 includes an arcuate recess 228. The shift lever 40 is receivable by the yoke 226 in the recess 228 when the shift lever 40 is in the transverse portion 38.

Figure 11:
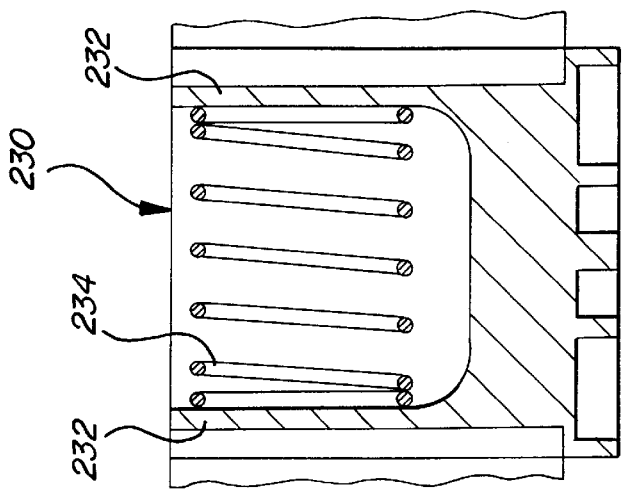
FIG. 11 is a sectional view taken along lines 11—11 of FIG. 9.
Figure 9:
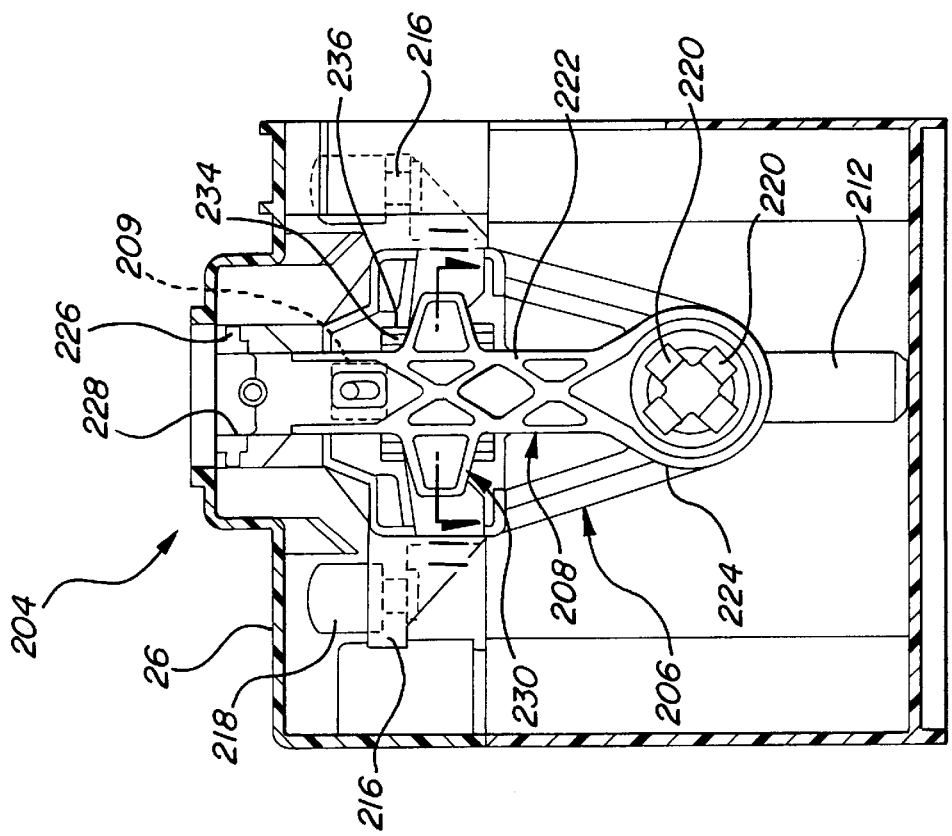
FIG. 9 is a sectional view taken along lines 9—9 of FIG. 8.

Referring now to FIGS. 9 and 11, the proximity switch assembly 204 includes a centering mechanism, generally indicated at 230 which is disposed between the yoke 226 and the hub 224. The centering mechanism 230 urges the shift lever engagement member 208 to a neutral position between the first and second transverse positions. The centering mechanism 230 includes a pair of arms 232 extending transversely from the body 222 in a direction opposite to the yoke 226 in spaced parallel relationship with respect to each other. The centering mechanism 230 includes a coiled spring 234 captured between a pair of flanges 236 on the switch housing 206 and is compressible in the direction of both the first and second transverse positions to exert a centering force on the shift lever engagement member 208 to urge the member 208 to the neutral position.

Figure 7:
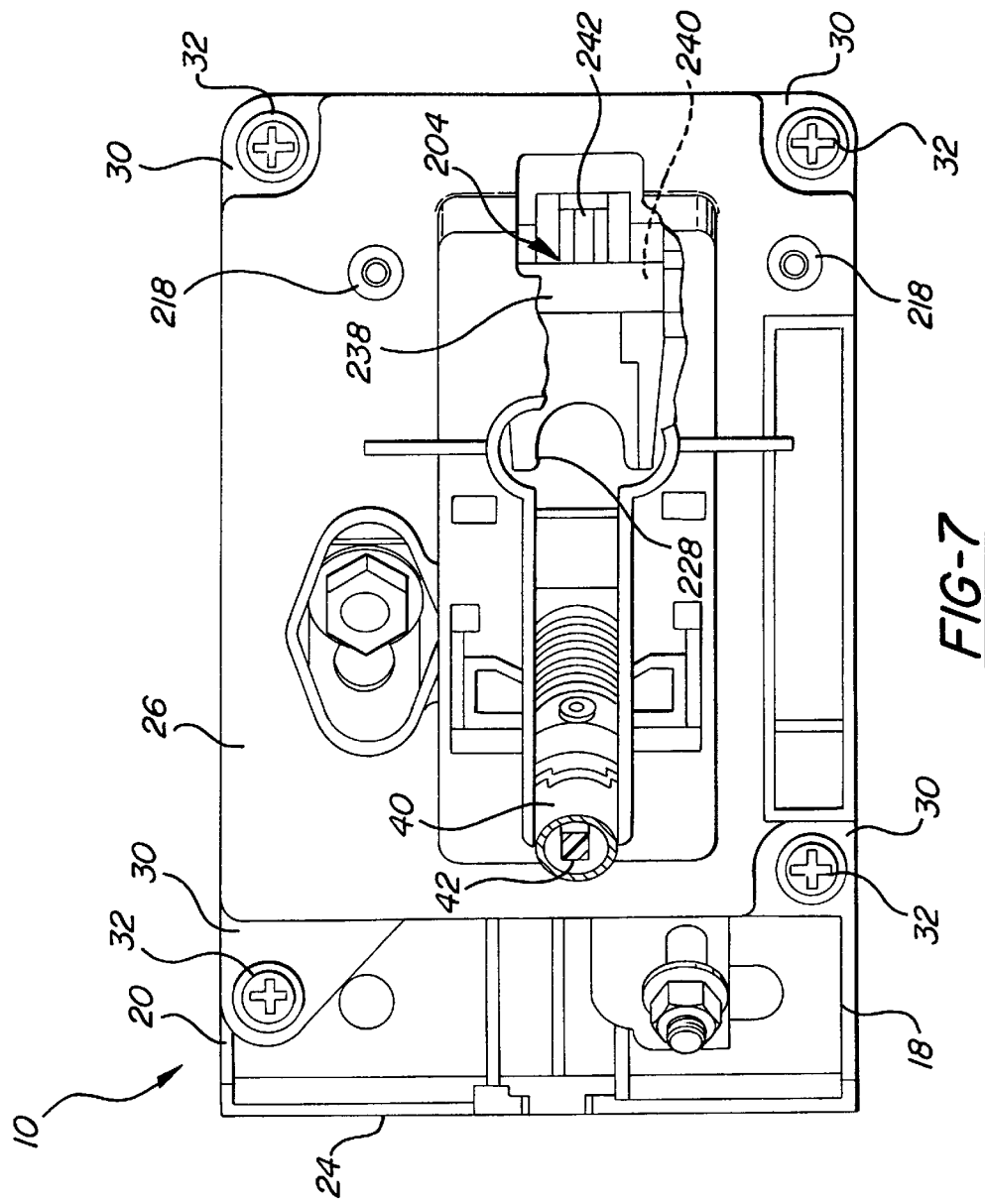
FIG. 7 is an enlarged plan view of another embodiment according to the present invention, of the shift control mechanism of FIG. 1.
Figure 8:
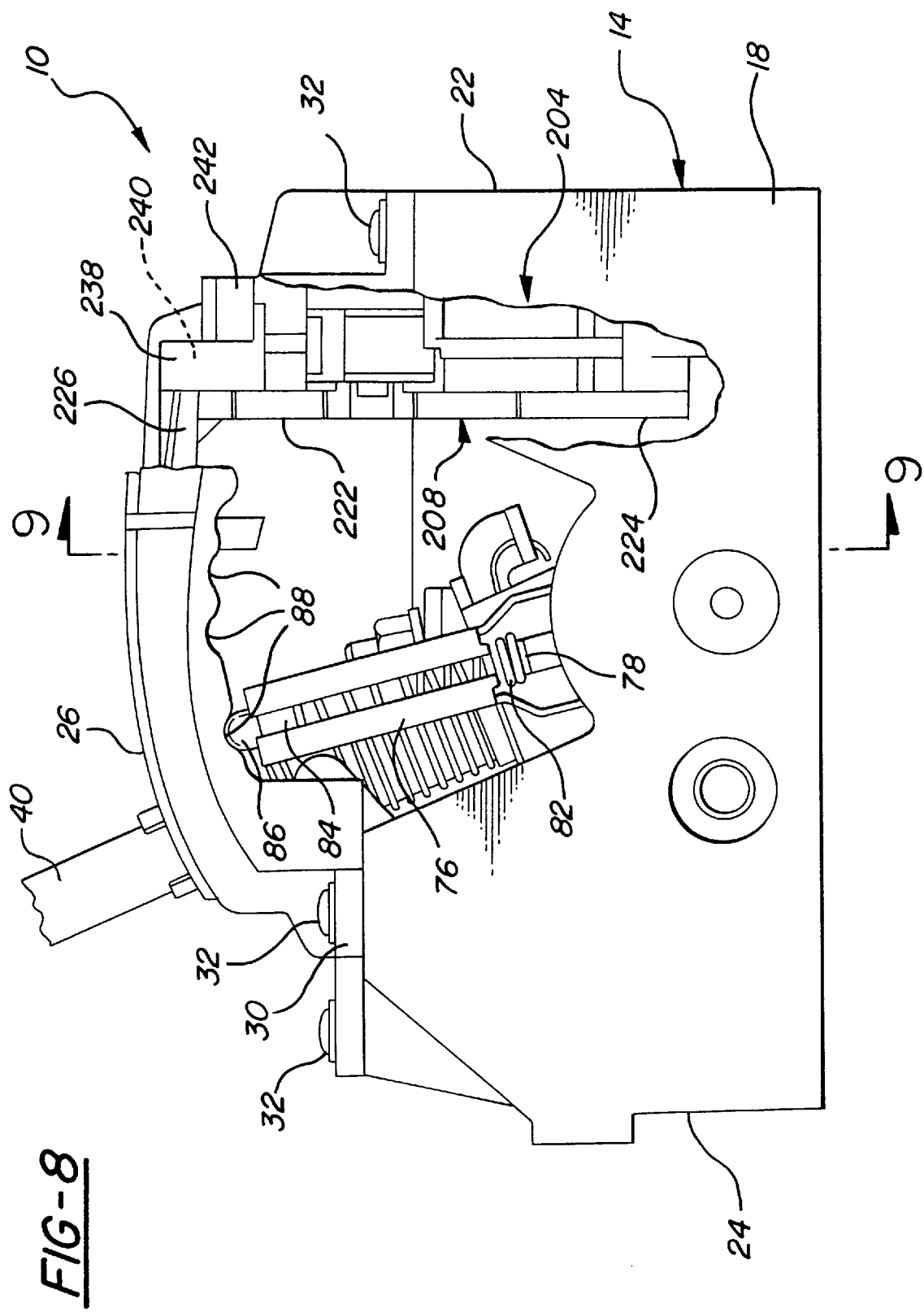
FIG. 8 is a fragmentary side elevational view of the shift control mechanism of FIG. 7.

As best shown in FIGS. 7 and 9, the switch housing 206 also includes a compartment 238 disposed in spaced relationship but immediately adjacent the shift lever engagement member 208 at the yoke 226. The proximity switch assembly 204 includes a proximity or Hall Effect sensor/switch 240 disposed within the compartment 238 and operatively connected to a power source through a connector 242. The Hall Effect sensor/switch 240 is capable of sensing the movement of the shift lever engagement member 208 with the shift lever 40 as the shift lever 40 is moved to the first and second transverse positions. The Hall Effect sensor/switch 240 generates a signal in response to the movement of the magnet 209 on the shift lever engagement member 208 to manually upshift and downshift the automatic transmission. It should be appreciated that the Hall Effect sensor/switch 240 is conventional.

Figure 10:
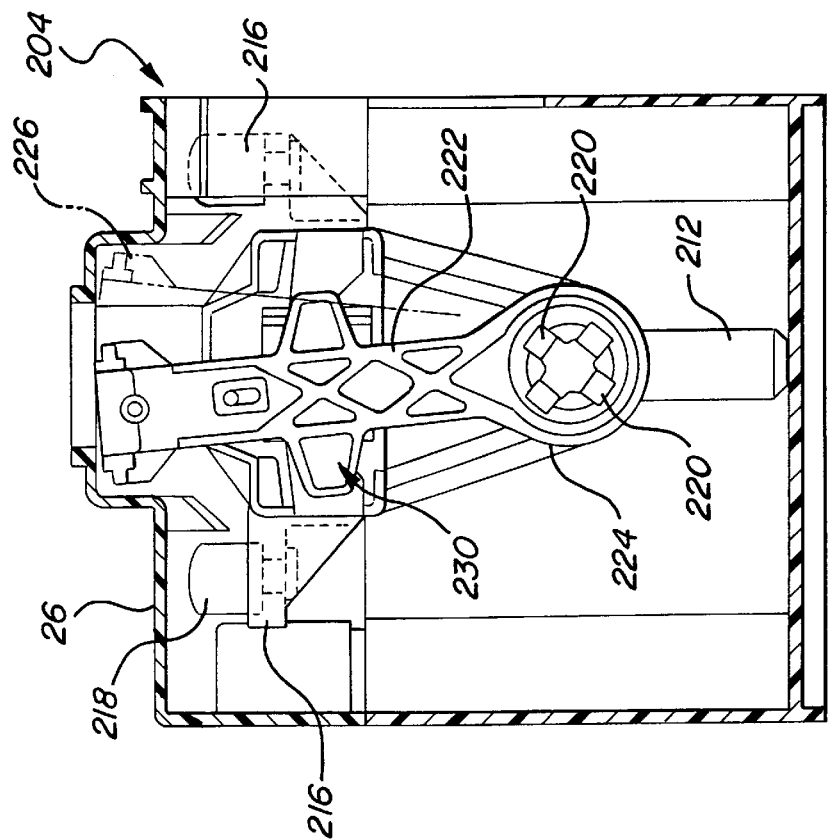
FIG. 10 is a view similar to FIG. 9 illustrating the shift control mechanism in a second operational position.

In operation, when the shift lever 40 and shift lever engagement member 208 are moved to either the first or second transverse positions within the transverse portion 38, the Hall Effect sensor/switch 240 senses the movement of the change in magnetic field provided by the magnet 209 and sends a signal to the transmission controller which then executes a command to downshift or upshift the automatic transmission. As illustrated in FIG. 10, when the shift lever 40 and thus the shift lever engagement member 208 are moved transversely, one of the arms 232 of the centering mechanism 230 will act to compress the coiled spring 234. After the operator releases the shift lever 40, the coiled spring 234 acts to exert a centering force on the shift lever engagement member 208 to urge the member 208 and shift lever 40 to the neutral position.

Accordingly, the shift control mechanism 10 allows an operator to choose complete automatic control of the automatic transmission by leaving the shift lever 40 in the longitudinal portion 36 of the guide slot 34 or can change gears manually by moving the shift lever 40 in the transverse portion 38 of the guide slot 34. Also, the shift control mechanism 10 may use a Hall Effect sensor/switch 240 to sense the position of the shift lever 40 to generate a signal to manually shift the automatic transmission.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A shift control mechanism for manually shifting an automatic transmission comprising:
    a housing including a shift control pattern having a longitudinal portion defining a plurality of automatic transmission operating settings and a transverse portion at one end of said longitudinal portion for manually shifting said transmission;
    a shift lever manually movable along said shift control pattern for selecting said automatic transmission operating settings and for manually shifting said transmission;
    a switch actuated by moving said shift lever in a direction perpendicular to said longitudinal portion in said transverse portion to send a signal to manually upshift or downshift the automatic transmission; and
    a centering mechanism for centering said shift lever within said transverse portion.

2. The mechanism of claim 1 wherein said switch includes a switch housing and a shift lever engagement member pivotally mounted to said switch housing and moveable with said shift lever to manually shift the automatic transmission.

3. The shift control mechanism as set forth in claim 2 wherein said shift lever engagement member includes a body and a yoke disposed at one end of said body, said shift lever being receivable by said yoke when said shift lever is in said transverse portion.

4. The shift control mechanism as set forth in claim 2 wherein said switch housing includes a compartment disposed in spaced relationship immediately adjacent said shift lever engagement member, said shift lever engagement member having a magnet thereon, a Hall Effect sensor disposed within said compartment and capable of sensing the movement of said magnet on said shift lever engagement member, said Hall Effect sensor generating a signal in response to the movement of said magnet of said shift lever engagement member to manually upshift or downshift said automatic transmission.

5. The mechanism of claim 1 wherein said switch comprises a Hall Effect sensor.

6. The shift control mechanism of claim 1, wherein said centering mechanism includes spring.

7. The shift control mechanism of claim 6, wherein said spring includes a coil portion attached to said housing and a pair of fingers, said shift lever disposed between said pair of fingers.

8. The shift control mechanism of claim 7, wherein said pair of fingers are transversely spaced by a spacer attached to said housing.

9. The shift control mechanism of claim 6, wherein said centering mechanism comprises a coiled spring captured between a pair of flanges on said housing.

10. The shift control mechanism of claim 1, wherein said centering mechanism comprises a coiled spring captured between a pair of flanges on said housing.

11. A shift control mechanism for manually shifting an automatic transmission comprising:
    a housing including a shift control pattern having a longitudinal portion defining a plurality of automatic transmission operating settings and a transverse portion at one end of said longitudinal portion for manually shifting said transmission;
    a shift lever manually movable along said shift control pattern for selecting said automatic transmission operating settings and for manually shifting said transmission;
    a switch actuated by moving said shift lever in a direction perpendicular to said longitudinal portion in said transverse portion; and
    a centering mechanism for centering said shift lever within said transverse portion;
    said switch including a switch housing and a shift lever engagement member pivotally mounted to said switch housing and moveable with said shift lever;
    said switch housing including a compartment disposed in spaced relationship immediately adjacent said shift lever engagement member, said shift lever engagement member having a magnet thereon, a Hall Effect sensor disposed within said compartment and capable of sensing the movement of said magnet of said shift lever engagement member, said Hall Effect sensor generating a signal in response to the movement of said magnet of said shift lever engagement member to manually upshift or downshift said automatic transmission.

12. The shift control mechanism of claim 11, wherein said centering mechanism includes spring.

13. The shift control mechanism of claim 12, wherein said spring includes a coil portion attached to said housing and a pair of fingers, said shift lever disposed between said pair of fingers.

14. The shift control mechanism of claim 13, wherein said pair of fingers are transversely spaced by a spacer attached to said housing.

15. The shift control mechanism as set forth in claim 11 wherein said shift lever engagement member includes a body and a yoke disposed at one end of said body, said shift lever being receivable by said yoke when said shift lever is in said transverse portion.

* * * * *